United States Patent [19]

Min

[11] Patent Number: 5,623,248

[45] Date of Patent: Apr. 22, 1997

[54] MINIATURE ELECTROMAGNETIC IMPACT SENSOR

[76] Inventor: Byung W. Min, 930 De Linda La., La Canada, Calif. 91011

[21] Appl. No.: 471,399

[22] Filed: Jun. 6, 1995

[51] Int. Cl.[6] .................................................. G08B 13/02
[52] U.S. Cl. ...................... 340/540; 340/429; 340/566; 340/665; 340/669
[58] Field of Search .................................. 340/566, 429, 340/669, 665, 540

[56] References Cited

U.S. PATENT DOCUMENTS

| | | | |
|---|---|---|---|
| 4,322,714 | 3/1982 | Morgan | 340/566 |
| 4,584,569 | 4/1986 | Lopez et al. | 340/566 |
| 4,864,288 | 9/1989 | Cross | 340/566 |
| 4,890,265 | 12/1989 | Goldstein | 340/566 |
| 4,920,332 | 4/1990 | Philippe | 340/566 |
| 5,459,447 | 10/1995 | Snyder et al. | 340/429 |
| 5,483,225 | 1/1996 | Hwang | 340/566 |

*Primary Examiner*—Glen Swann
*Attorney, Agent, or Firm*—Darby & Darby, P.C.

[57] ABSTRACT

A self-contained electromagnetic impact sensor includes a frame, a fixed permanent magnet, a fixed coil, and a metallic body elastically mounted for movement within the frame. An impact received by the sensor imparts motion to the metallic body, thereby altering the pattern of magnetic flux extending from the permanent magnet and through the coil. An electrical signal is produced within the coil, which is processed and compared to one or more threshold levels to drive one or more corresponding output triggers.

32 Claims, 4 Drawing Sheets

MINIATURE ELECTROMAGNETIC IMPACT SENSOR

BACKGROUND OF THE INVENTION

The invention relates to electromagnetic impact sensors, and more particularly to miniature self-contained electromagnetic impact sensors for use in security systems, gaming devices, and other applications.

Impact sensors, or shock sensors, play an important role in security systems for automobiles, buildings, and other objects, and are often used in gaming devices as well as numerous other applications to detect or count impacts. While most impact sensors have a common purpose, namely to produce an electrical signal in response to an impact or sudden acceleration, they may be embodied in any of a variety of forms. Common types of impact sensors include electromechanical and electromagnetic sensors.

One type of impact detector, an electromechanical sensor, uses an electrical contact mounted for movement with a weighted spring or pendulum. When an impact is experienced, the spring or pendulum moves, causing the first contact to touch another electrical contact. This completes an electrical circuit and triggers an alarm or other event. Electromechanical sensors have disadvantages for several reasons: they are often not easily tuned or calibrated, since their characteristics are reliant on mechanical relationships; the mechanical springs and contacts may be subject to wear and possible corrosion, changing the characteristics of the device over time; and they may not be omnidirectionally sensitive, since the suspended contact must be mounted from at least one direction. Such sensors also typically provide a series of different outputs after each impact, because the weighted contact continues to oscillate through several complete cycles before the impact energy dissipates. During this time, the devices are incapable of sensing further impacts.

Electromagnetic impact sensors are in wide use, particularly in automotive security systems. Traditional electromagnetic impact sensors include a sensor coil fixed relative to an object whose motion is to be detected, and a permanent magnet on an elastic support. See, for example, U.S. Pat. No. 4,584,569 to Lopez et al., issued Apr. 22, 1986 and entitled "Motion Sensitive Security System." When at rest, the sensor coil intercepts a portion of the magnetic flux associated with the permanent magnet. When the object is struck, the permanent magnet will be displaced from its rest position, and the flux intercepted by the sensor coil is altered, thereby inducing an electrical potential, V, across the coil according to the equation $V=N(d\Phi/d\tau)$, where N is the number of turns of wire in the coil, $\Phi$ is the magnetic flux, and $\tau$ is time. When the induced potential, V, exceeds a certain threshold, an alarm or other event is triggered.

Traditional electromagnetic impact sensors have significant disadvantages, however, primarily resulting from the fact that they rely on movement of a permanent magnet to sense impact. The resonant frequency of the sensor is dependent on the mass of its magnet and the spring constant of its support. Because magnetizable materials typically are not very dense, a relatively large magnet must be used. This places a lower limit on the size of prior electromagnetic impact sensors. In addition, because of the size required, large ranges of motion are possible, and a relatively large separation between the permanent magnet and the coil is necessary. If, for size reasons, the permanent magnet is constrained from moving in any given direction, then the sensor will not be sensitive to impacts in that direction.

These shortcomings of traditional electromechanical and electromagnetic impact sensing devices highlight the need for an improved sensor which is simple, reliable, inexpensive, and small, yet sensitive to movement in all directions and tunable to various frequencies for different applications.

SUMMARY OF THE INVENTION

An electromagnetic impact sensor according to the present invention includes a coil and a permanent magnet in a fixed relationship and a movable metal body. In a preferred embodiment, these elements are all contained in a miniature self-contained package.

Unlike traditional electromagnetic impact sensors, both the coil and the permanent magnet of the invention are fixed in relation to the object whose motion will be sensed. A dense metallic body is elastically suspended near the coil and the permanent magnet for damped translational motion relative to them. When the metallic body is at rest, a portion of the magnetic flux from the permanent magnet is intercepted and redirected by the body. At least part of the redirected flux is intercepted by the coil. An impact to the object imparts motion to the metallic body, thereby altering the flux through the coil and inducing a potential difference across the coil. This is done passively, and requires no bias or other stimulus to the sensor.

The potential difference across the coil is then processed to provide a clean output. First, the electrical signal is amplified and compared to a reference level. If the impact signal exceeds the reference level, an electrical output pulse is generated to trigger an alarm, count impacts in a game, or cause some other event to occur. In one embodiment, two or more reference levels are used to provide a warning before a full-scale alarm is triggered.

An impact sensor according to a preferred embodiment of the present invention includes a plastic frame having a bobbin portion, a coil wound around the bobbin, a small permanent magnet at the center of the coil, and a metallic body suspended within the frame by a spring or other resilient structure made of a silicone elastomer. The plastic frame may be directly attached to a circuit board or other suitable mechanical support through which impacts are to be received. The circuit board may then contain the circuit elements necessary to process the electrical signal generated by an impact into one or more trigger pulses recognizable by external devices such as alarms.

The impact sensor of the present invention is simple. It consists of a small number of easily manufactured components, which combine to form a self-contained unit which may be anchored to a circuit board by its electrical contacts. It is also reliable: the only moving parts are the metallic body and the silicone spring, and neither item is fragile. In particular, the components are resistant to heat, chemicals, and impact. Furthermore, the metallic body is constrained in motion in all directions by the frame and the circuit board, preventing breakage resulting from overstressing the spring.

An impact sensor according to the present invention is inexpensive, because the plastic housing, the coil, the permanent magnet, the spring, and the metallic body may all be fabricated from common and inexpensive materials. Furthermore, the configuration is not complicated or difficult to manufacture. The sensor can be manufactured to be very small, since all of the components of the impact sensor can be attached to or contained within a plastic housing on the order of one half inch in each dimension, depending on the application.

Unlike many traditional impact sensors, a sensor according to the present invention is omnidirectionally sensitive. In particular, the metallic body may be suspended to allow damped motion within the housing in any direction; any such motion will cause sufficient change in the patterns of magnetic flux to induce a potential across the coil.

In addition, sensors for different applications may be tuned to different frequencies by altering the mass of the metallic body or the size of the silicone spring.

An impact sensor made in accordance with the present invention exhibits all of the foregoing advantages, and can be modified in a multitude of ways, while retaining the noted advantages, for use in a large number of applications.

BRIEF DESCRIPTION OF THE DRAWINGS

The above and other features of the present invention may be more fully understood from the following detailed description, taken together with the accompanying drawings, wherein similar reference characters refer to similar elements throughout and in which.

DESCRIPTION OF THE PREFERRED EMBODIMENT

As required, a detailed illustrative embodiment of the present invention is disclosed herein. However, an impact sensor in accordance with the present invention may be embodied in a wide variety of forms, some of which may be quite different from those of the disclosed embodiment. Consequently, the specific structural and functional details disclosed herein are merely representative; yet in that regard, they are deemed to afford the best embodiment for purposes of disclosure and to provide a basis for the claims herein which define the scope of the present invention.

Figure 1:
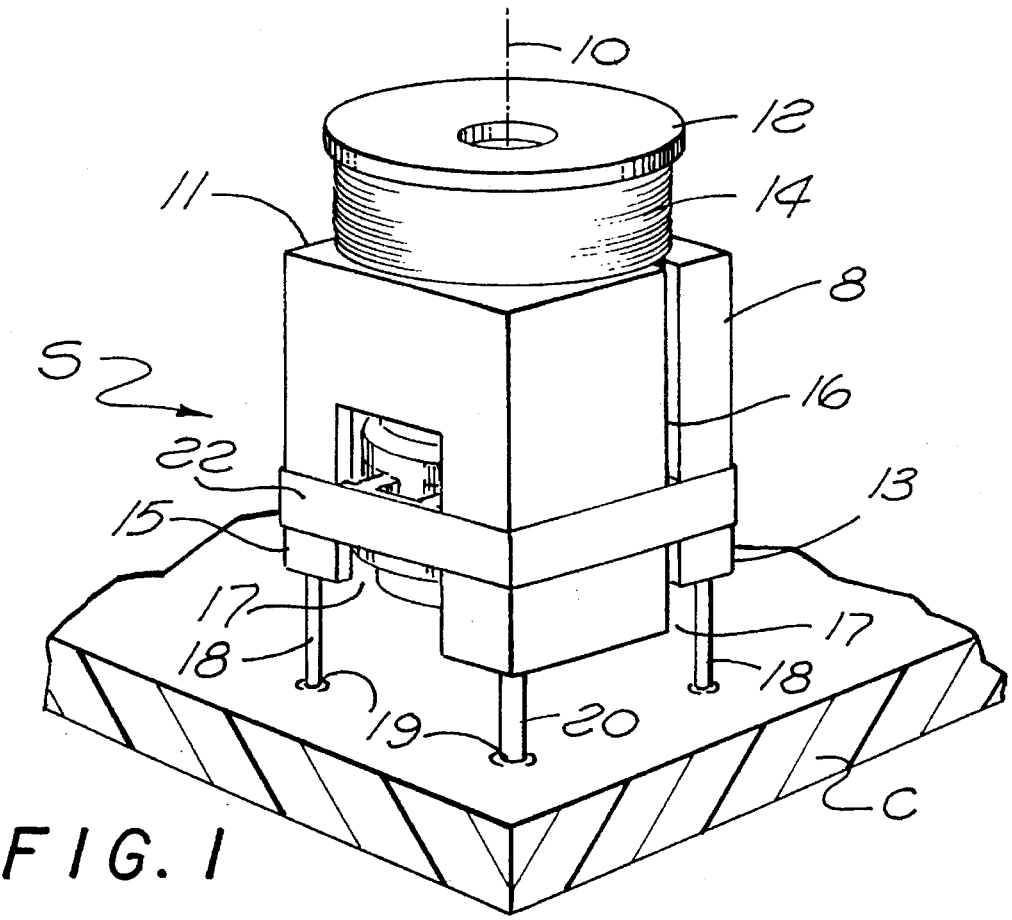
FIG. 1 is a perspective view of an impact sensor according to the present invention.

Referring to FIG. 1, an impact sensor S according to the present invention includes a frame 8 configured generally in the form of a hollow rectangular box having a vertical longitudinal axis 10. The frame 8 has a top end 11 defining an axial bobbin 12 and a bottom end 13 having four legs 15 separated by notches 17 around the periphery of the frame 8. Wound around the bobbin 12 is a coil 14 of conductive wire. The wire extends downwardly from the coil 14 and through a pair of grooves 16 in opposite sides of the frame 8 to the bottom end 13, where the wire is attached to a pair of electrical contacts 18 at opposite corners of the frame 8. The bottom end 13 further defines a pair of mounting posts 20 at the corners of the frame 8 not occupied by the electrical contacts 18. The mounting posts 20, as well as the electrical contacts 18, are snugly received within complementary openings 19 of a circuit board C or other rigid object for mechanical and electrical connection of these components. A resilient structure, specifically a silicone spring 22, encompasses the legs 15 of the frame 8 between the top end 11 and the bottom end 13.

Figure 2:
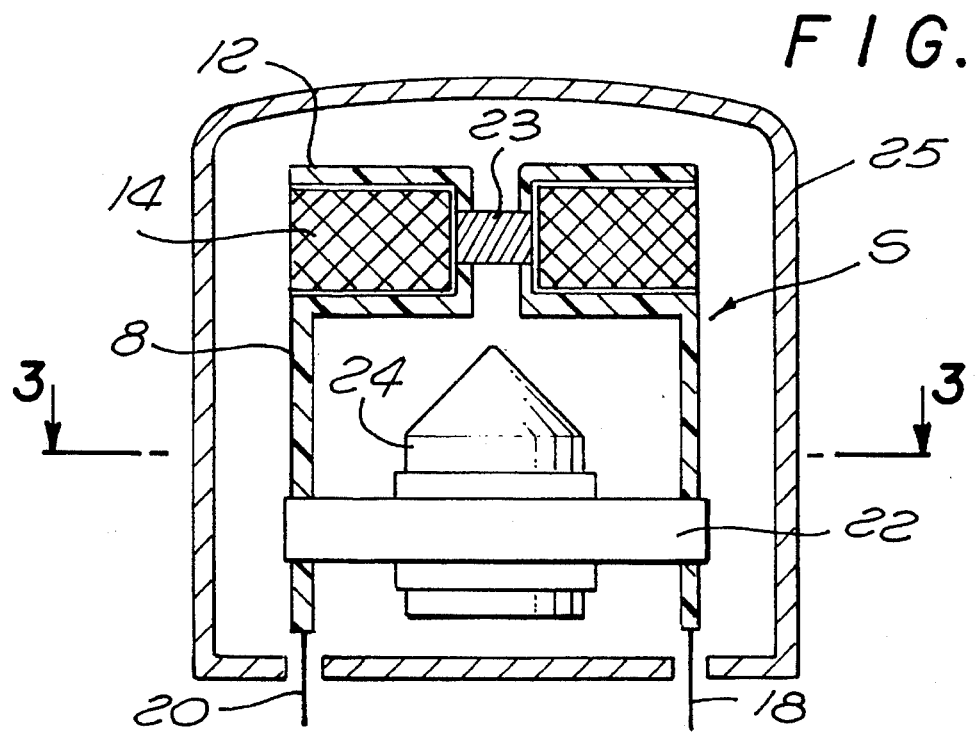
FIG. 2 is an elevational view of the impact sensor of FIG. 1, with the frame, bobbin, coil, permanent magnet, and shield shown in section.

FIG. 2 illustrates the interior of the sensor S shown in FIG. 1. At the center of the coil 14 is a permanent magnet 23, which is also coaxial with the frame 8. The elastic spring 22 holds a metallic body 24 at or near the center of the frame 8.

In one alternative embodiment, the impact sensor S is provided with a grounded metal shield 25 surrounding the housing 8, the permanent magnet 23, the coil 14, the spring 22, and the metallic body 24. Such a shield will prevent the sensor S from triggering false alarms caused by spurious electrical potentials induced in the coil 14 by electromagnetic noise received from the environment.

Figure 3A:
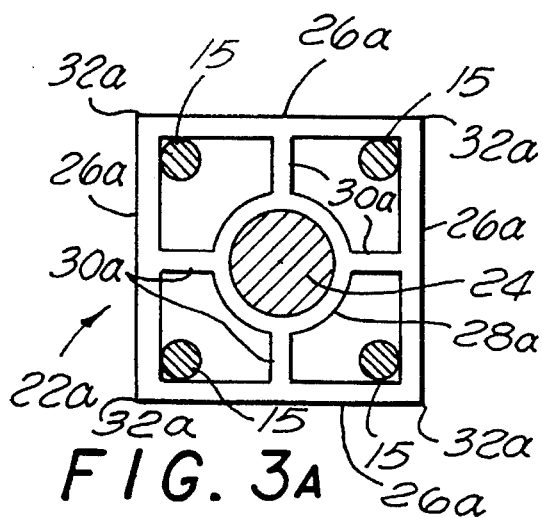
FIG. 3A is a horizontal sectional view of the impact sensor, taken along the line 3—3 of FIG. 2.
Figure 3B:
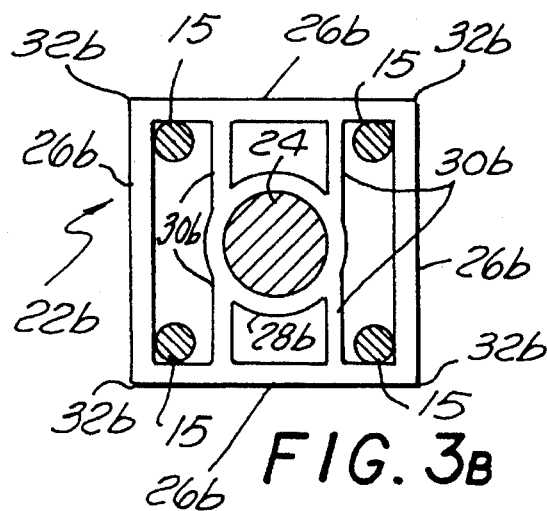
FIG. 3B is a horizontal sectional view of an alternative embodiment of the impact sensor, taken along the line 3—3 of FIG. 2.

A preferred form of the spring 22 is shown in FIG. 3A as a spring 22a. An alternate embodiment of the spring 22 is shown in FIG. 3B as a spring 22b. Corresponding parts of the springs 22a and 22b are depicted using the same reference numerals followed by "a" or "b", respectively. Like the frame 8, the spring 22 has a square profile. Referring first to FIG. 3A, each corner 32a of the spring 22a is frictionally held by one of the legs 15 of the frame 8. The corners 32a are connected by side portions 26a. At the center of the spring 22a is a circular central seat portion 28a, adapted to hold the metallic body 24 in frictional engagement. The seat portion 28a is connected to the side portions 26a by four support arms 30a disposed circumferentially around the seat portion 28a and each attached to a different side portion 26a. In the alternate embodiment shown in FIG. 3B, the seat portion 28b may be connected to two opposing side portions 26b by four support arms 30b arranged in pairs on opposite sides of the seat portion. In FIG. 3A or FIG. 3B, all portions of the spring 22a or 22b are provided with a substantial thickness along the direction of the longitudinal axis 10, so that rotational motion of the metallic body 24 is substantially eliminated. The side portions 26a or 26b, the central seat portion 28a or 28b, and the support arms 30a or 30b, may be molded of a silicone elastomer material in a single piece.

Figure 4:
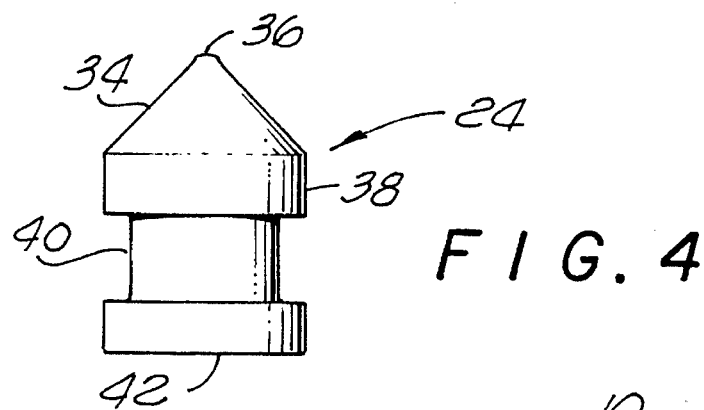
FIG. 4 is an elevational view of the metallic body of the impact sensor of FIG. 2.

FIG. 4 illustrates a preferred configuration of the metallic body 24. The metallic body includes a substantially cylindrical trunk section 38 terminating in a flat rear face 42. In the illustrated embodiment, the trunk section 38 includes a recessed beltline portion 40 to receive the seat portion 28 of the spring 22. At an end opposite the rear face 42, the trunk section 38 tapers conically to a tip 34 having a blunt front face 36. The entire metallic body 24 is axially symmetrical. When mounted within the frame 8, the metallic body 24 is centered on the axis 10 and oriented with its tip 34 proximate to the permanent magnet 23 (FIG. 2)

Figure 5:
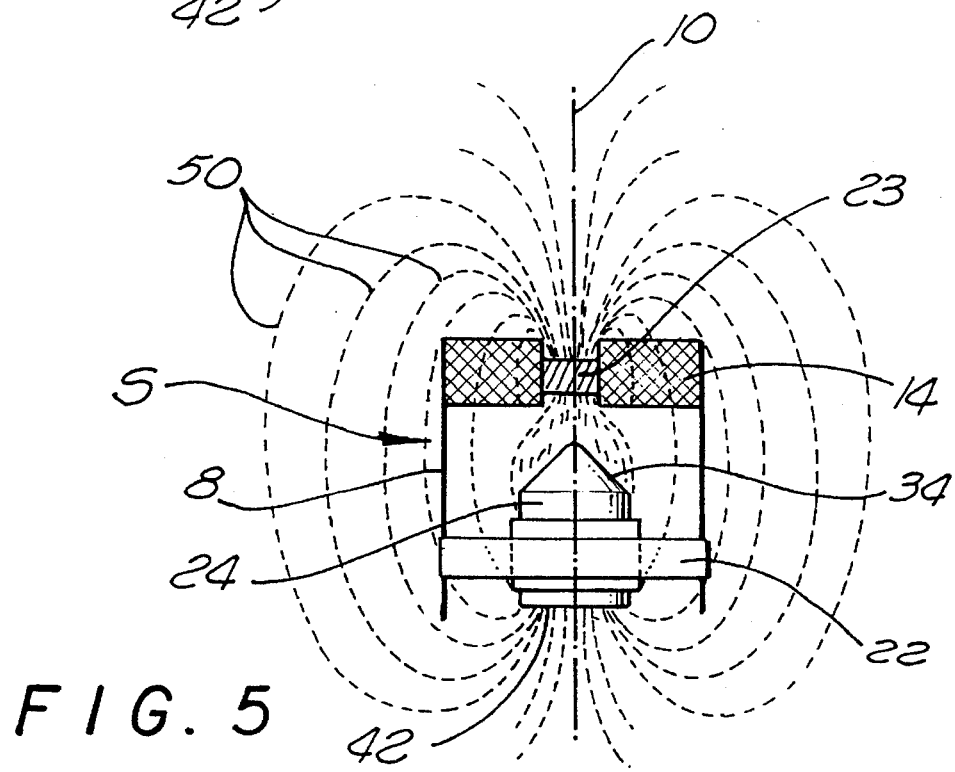
FIG. 5 is an elevational view similar to FIG. 2, but with the patterns of magnetic flux emanating from the permanent magnet illustrated in broken lines.

FIG. 5 illustrates the pattern of magnetic flux 50 emanating from the permanent magnet 23 in the region of the frame 8. When the impact sensor S is in an equilibrium condition, the metallic body 24 is stationary within the frame 8. If the impact sensor S is subjected to a constant acceleration, such as gravity, the metallic body 24 may be displaced somewhat from the axis 10, but is otherwise centered. The permanent magnet 23 serves as a source of magnetic flux 50, which passes along a magnetic circuit including the metallic body 24 and the coil 14. The polarity of the permanent magnet 23 is not critical.

When the impact sensor S is in equilibrium, the metallic body 24 is at rest, and the magnetic flux 50 is stationary. When an impact is received by the sensor S, the momentum imparted to the heavy metallic body 24 acts against the spring 22, causing the metallic body to move with respect to the frame 8. After the impact, the spring 22 urges the metallic body 24 back towards its equilibrium position and damps its motion.

The metallic body 24 can move in any direction under the influence of impact forces. In normal operation, the only constraint is the spring 22, which stretches to accommodate translational motion in any of three orthogonal directions. When such movement occurs, the metallic body 24 diverts the path of the magnetic flux 50, altering the flux impinging on the coil 14 and inducing an electrical potential across it. This electrical potential is imposed across the electrical contacts 18 for further processing.

Figure 6:
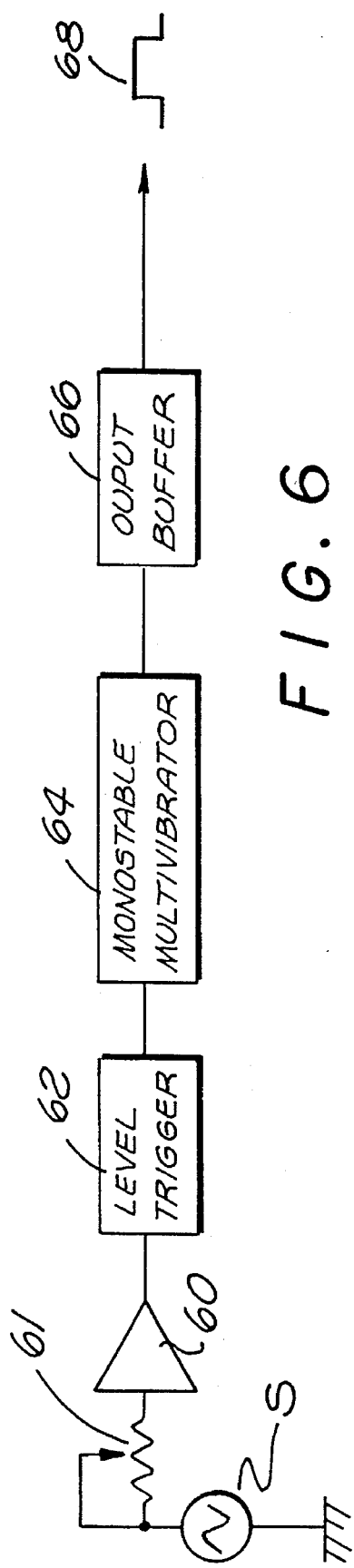
FIG. 6 is a simplified block diagram of a signal processing circuit for use with an impact sensor according to the present invention.

The impact sensor S converts the force of an impact into an electrical impulse by means of an electrical circuit of the type illustrated in block diagram form in FIG. 6. The electrical potential across the coil 14 of the impact sensor S is applied to an amplifier 60 by way of a variable resistor 61, through which the sensitivity of the device can be adjusted. The amplifier 60 converts the potential received from the sensor S into a stronger analog signal suitable for further processing. The output of the amplifier 60 is applied to a level trigger 62, which detects when the signal from the amplifier 60 exceeds a predetermined threshold level, and outputs a binary signal when the threshold is exceeded. A monostable multivibrator 64 converts the binary signal into a clean output pulse 68, which is applied to external circuitry (not shown) through an output buffer 66. The duration of the output pulse 68 is selected to overlap and compensate for any possible false triggers caused by underdamped oscillation of the metallic body 24.

Figure 7:
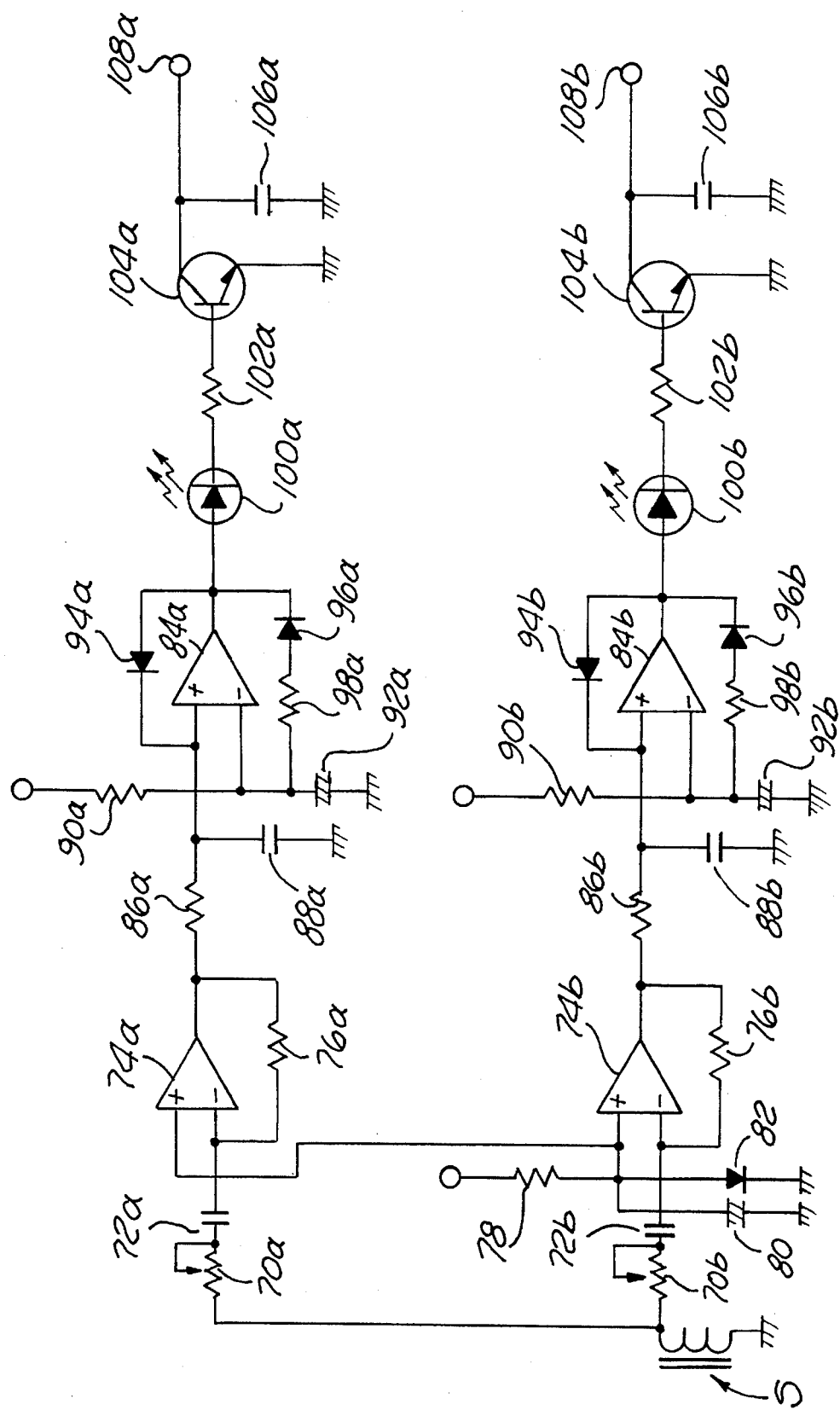
FIG. 7 is an electrical schematic diagram showing one embodiment of a signal processing circuit for use with an impact sensor according to the present invention, the circuit being capable of providing two separate trigger outputs having different threshold levels.

FIG. 7 illustrates, in schematic form, a preferred embodiment of an output circuit for the impact sensor S. Two parallel signal processing paths are shown in FIG. 7, each of which corresponds to the circuit described functionally in FIG. 6. In referring to components illustrated in FIG. 7, a single reference number followed by "a" or "b" will be used to refer to corresponding components in each of the two separate signal paths. The sensitivity of each signal path may be calibrated separately through a respective variable resistor 70a or 70b. In this manner, the sensitivity of one output can be set lower than another, so that a warning signal will be provided at one of the outputs before an alarm is triggered by the other. The impact sensor S is coupled to the input of an operational amplifier 74a or 74b through the variable resistor 70a or 70b and a coupling capacitor 72a or 72b. The operational amplifier 74a or 74b, which has a feedback resistor 76a or 76b to control its gain, corresponds to the amplifier of FIG. 6. The reference inputs of both of the operational amplifiers 74a or 74b are coupled together and buffered by a combination of pull-up resistor 78, filter capacitor 80, and diode 82.

The operational amplifier 74a or 74b provides a signal to a comparator 84a or 84b by way of a level matching resistor 86a or 86b and a filter capacitor 88a or 88b. The comparator 84a or 84b outputs a pulse when a preset threshold is exceeded. In this circuit, the comparator 84a or 84b corresponds to a combination of the level trigger 62 and the monostable multivibrator 64 of FIG. 6. The reference level of the comparator 84a or 84b is set by the combination of a pull-up resistor 90a or 90b, a capacitor 92a or 92b, a diode 96a or 96b, and a resistor 98b or 98b. When the signal on the positive input of the comparator 84a or 84b goes higher than the reference level on the negative input, the output signal goes high, and the positive input follows because of feedback received through a diode 94a or 94b. The output signal from the comparator 84a or 84b stays high until the voltage on the negative input, provided by the capacitor 92a or 92b, charges through the pull-up resistor 90a or 90b and reaches the voltage of the positive input. In this manner, a single output pulse is provided when the reference level is exceeded.

The output from the comparator 84a or 84b passes through a light emitting diode 100a or 100b, providing a visual indication of the state of the signal processing path. Thus, the light emitting diodes 100a or 100b corresponding to each signal path will light individually when the threshold for the corresponding path is exceeded. Each of the parallel signals then passes through a second level matching resistor 102a or 102b and a buffer transistor 104a or 104b, and is filtered by a filter capacitor 106a or 106b, to provide a triggering signal at an output 108a or 108b; these components correspond to the output buffer 66 of FIG. 6. The signals at each of the two outputs 108a and 108b can be used to trigger an alarm, to drive a siren, to count impacts in a game, or to actuate a relay to control another electrical device.

In the disclosed embodiment, the components of the circuit represented in FIG. 7 have the following values or types: variable resistor 70a and 70b, 10K; capacitor 72a and 72b, 10 µF; resistor 76a and 76b, 750K; resistor 78, 220K; capacitor 80, 47 µF; diode 82, 1N4148; resistors 86a and 86b, 220K; capacitors 88a and 88b, 0.033 µF; resistors 90a and 90b, 470K; capacitors 92a and 92b, 0.47 µF; diodes 94a and 94b 1N4148; diodes 96a and 96b, 1N4148; resistors 98a and 98b, 33K; resistors 102a and 102b, 3.3K; transistors 104a and 104b, 2N2222; capacitor 106a and 106b, 0.1 µF. Each of the operational amplifiers 74a and 74b and comparators 84a and 84b use one quarter of a quad op-amp integrated circuit of type LM2902. Although the noted component values and types have been found to be advantageous in one embodiment of the present invention, it should be recognized that different components may be substituted in various applications without departing from the scope of the present invention.

In a preferred embodiment, the housing 8 (FIG. 1) is formed of an injection-molded plastic material, and the spring 22 is molded from a synthetic elastomer, such as silicone. The metallic body 24 (FIG. 2) is preferably made of non-annealed iron, although a number of other metals will work in this application. The material selected should be highly dense and have a high absolute susceptibility, and should be substantially non-ferromagnetic, so that no measurable magnetization is retained when the body is removed from a magnetic field. Any remanent magnetic field in the metallic body can undesirably alter the characteristics of the impact sensor S. Any of several cobalt alloys are also effective for use in the metallic body 24, which may be either paramagnetic or diamagnetic.

Figure 8:
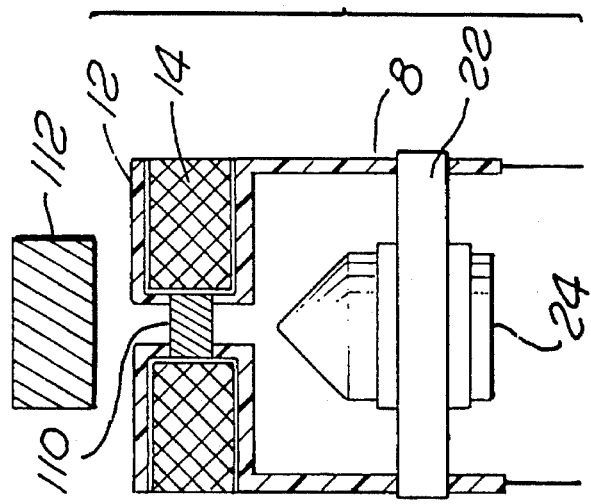
FIG. 8 is an elevational view of an impact sensor according to the present invention, with the frame, bobbin, coil, external magnet, and metallic core shown in section.

The specific characteristics of the permanent magnet 23 are not critical to the operation of the present invention;

however, the magnet should not be so strong that the motion of the metallic body 24 is affected by the magnetic field. In a preferred embodiment, the permanent magnet 23 is a ferrite cylinder approximately 2.5 mm in diameter and 2 mm in height. Placement of the permanent magnet 23 is also not critical, as long as some portion of the magnetic flux 50 passes through the metallic body and the coil. If another source of magnetic flux is available, the permanent magnet 23 may be omitted from the impact sensor S and replaced with a metallic core 110 (FIG. 8) to enhance the portion of the magnetic field passing through the coil 14. In one alternative embodiment, the magnetic flux 50 may originate in an external magnet 112 (FIG. 8), which can be a component of a siren or other magnetic device external to the impact sensor S.

The exact characteristics of the coil are not critical, and may vary in different applications. However, in a preferred embodiment, the coil consists of approximately 900 turns of 0.07 mm wire. With this configuration, and a ferrite magnet of the size described above, full deflection of the metallic body 24 will result in a potential of approximately 0.002 volts (2 mV) across the coil.

By selecting the mass of the metallic body 24 and the spring constant of the spring 22, the impact sensor S can be tuned to respond to motion within a specific range of frequencies. Although frequencies as low as 5 Hz are feasible, a more common desired frequency would be in the range of 50–100 Hz, particularly 60 Hz, for an automotive security system. At this range of response frequencies, wind, which has a frequency of approximately 1 Hz, will be excluded, as will thunder, which has a range of frequencies even higher than the selected band of 50–100 Hz. In a preferred embodiment having a vibration frequency of approximately 60 Hz, the metallic body 24 has a weight of 1.6 g, and the spring 22 has a spring constant of 227 N/m.

In view of the above explanation of the exemplary system, it will be appreciated that embodiments of the present invention may be employed in many different applications to produce an electrical pulse representative of an impact exceeding a certain threshold. While certain exemplary structures and operations have been described herein, the appropriate scope hereof is deemed to be in accordance with the claims as set forth below.

What is claimed is:

1. An impact sensor for sensing an impact applied through an external structure, comprising:

a frame mountable to the external structure;

a magnet in a first fixed position relative to said frame, serving as a source of magnetic flux;

a conductive coil in a second fixed position relative to said frame, exposed to at least a portion of said magnetic flux; and a metallic body mounted for movement with respect to said frame in response to an impact, to alter said portion of said magnetic flux and induce an electrical potential across said coil.

2. The impact sensor of claim 1, wherein said metallic body is mounted for translational movement with respect to said frame.

3. The impact sensor of claim 1, wherein said metallic body is mounted for damped translational movement with respect to said frame.

4. The impact sensor of claim 1, wherein said metallic body is mounted to said frame by a resilient structure.

5. The impact sensor of claim 4, wherein said resilient structure comprises an elastic material.

6. The impact sensor of claim 5, wherein said resilient structure comprises a silicone elastomer.

7. The impact sensor of claim 5, wherein:

said frame comprises a plurality of legs for attachment to the external structure;

said resilient structure fits around said legs; and said resilient structure further comprises a plurality of elastic supports for attachment to said metallic body.

8. The impact sensor of claim 7, wherein said supports are circumferentially disposed around said metallic body.

9. The impact sensor of claim 4, wherein said metallic body has an axially symmetrical profile.

10. The impact sensor of claim 9, wherein said metallic body comprises a tapered portion proximate to said magnet.

11. The impact sensor of claim 10, wherein said tapered portion terminates in a flat surface proximate to said magnet.

12. The impact sensor of claim 9, wherein said metallic body comprises a narrowed waist section for mating engagement with said resilient structure.

13. The impact sensor of claim 1, wherein said frame comprises a substantially non-magnetic material.

14. The impact sensor of claim 1, wherein said magnet comprises a permanent magnet.

15. The impact sensor of claim 1, wherein said magnet is located in a position external to said frame.

16. The impact sensor of claim 15, further comprising a metallic core within said coil.

17. The impact sensor of claim 1, wherein said magnet and said coil are positioned coaxially.

18. The impact sensor of claim 17, wherein:

said frame comprises a top end; and said magnet and said coil are affixed to the frame adjacent said top end.

19. The impact sensor of claim 17, wherein said magnet is located within said coil.

20. The impact sensor of claim 1, wherein said metallic body comprises a non-ferromagnetic metal.

21. The impact sensor of claim 1, wherein said metallic body comprises a non-ferromagnetic metal having a high absolute susceptibility.

22. The impact sensor of claim 1, wherein said metallic body comprises non-annealed iron.

23. The impact sensor of claim 1, wherein said metallic body comprises a non-ferromagnetic cobalt alloy.

24. The impact sensor of claim 1, further comprising at least one signal processing circuit, capable of providing an output pulse when said electrical potential exceeds a threshold level.

25. The impact sensor of claim 24, wherein said signal processing circuit comprises a signal amplifier coupled to receive said electrical potential.

26. The impact sensor of claim 25, wherein said signal processing circuit further comprises at least one level trigger coupled to said signal amplifier.

27. The impact sensor of claim 26, wherein said signal processing circuit further comprises a monostable multivibrator coupled to said level trigger.

28. The impact sensor of claim 27, wherein said signal processing circuit further comprises an output buffer coupled to said monostable multivibrator.

29. The impact sensor of claim 1, further comprising a plurality of signal processing circuits, wherein each of said signal processing circuits is capable of providing a separate output pulse when said electrical potential exceeds a respective threshold level.

30. The impact sensor of claim 1, further comprising a shield structure substantially enclosing said frame, said magnet, said coil, and said metallic body.

31. An impact sensor for sensing an impact applied through an external structure, comprising:
- a frame of substantially non-magnetic material comprising a top end and a plurality of legs for attachment to the external structure;
- a permanent magnet affixed to said frame adjacent said top end, serving as a source of magnetic flux;
- a conductive coil affixed to said frame adjacent said top end and coaxial with said permanent magnet, exposed to at least a portion of said magnetic flux;
- a resilient structure comprising a plurality of generally radial elastic supports disposed circumferentially and mountable to said legs;
- a non-ferromagnetic metallic body having a high absolute susceptibility, an axially symmetrical profile, and a tapered portion proximate to said permanent magnet terminating in a flat surface, mounted by said resilient structure for damped translational movement with respect to said frame in response to an impact, to alter said portion of said magnetic flux and induce an electrical potential across said coil; and
- at least one signal processing circuit, capable of providing an output pulse when said electrical potential exceeds a threshold level.

32. An impact sensor for sensing an impact applied through an external structure, comprising:
- a frame of substantially non-magnetic material comprising a top end and a plurality of legs for attachment to the external structure;
- a permanent magnet affixed to said frame adjacent said top end, serving as a source of magnetic flux;
- a conductive coil affixed to said frame adjacent said top end and coaxial with said permanent magnet, exposed to at least a portion of said magnetic flux;
- a resilient structure comprising a plurality of generally radial elastic supports disposed circumferentially and mountable to said legs;
- a non-ferromagnetic metallic body having a high absolute susceptibility, an axially symmetrical profile, and a tapered portion proximate to said permanent magnet terminating in a flat surface, mounted by said resilient structure for damped movement with respect to said frame in response to an impact, to alter said portion of said magnetic flux and induce an electrical potential across said coil; and
- at least one signal processing circuit, capable of providing an output pulse when said electrical potential exceeds a threshold level.

* * * * *